United States Patent [19]
Edelstein et al.

[11] Patent Number: 5,220,463
[45] Date of Patent: Jun. 15, 1993

[54] OPTICAL DELAY LINE

[75] Inventors: Daniel C. Edelstein, White Plains; William G. Clark, Pittsford, both of N.Y.

[73] Assignee: Clark Instrumentation, Inc., Pittsford, N.Y.

[21] Appl. No.: 647,294

[22] Filed: Jan. 29, 1991

[51] Int. Cl.$^5$ ............................................. G02B 5/08
[52] U.S. Cl. ..................................... 359/857; 359/861; 359/862
[58] Field of Search ............... 359/198, 199, 212, 213, 359/216, 223, 529, 850, 857, 861, 862, 871, 873

[56] References Cited

U.S. PATENT DOCUMENTS

| | | | |
|---|---|---|---|
| 3,734,591 | 5/1973 | Howe | 359/198 |
| 4,482,902 | 11/1984 | Bailey et al. | 359/213 |
| 4,647,144 | 3/1987 | Finkel | 359/212 |
| 4,953,961 | 9/1990 | Ubhayakar | 359/212 |
| 5,015,096 | 5/1991 | Kowalski et al. | 359/857 |

OTHER PUBLICATIONS

Apparatus and Techniques: A self-aligning scanning optical delay line (C. N. Ironside and D. J. Morris)—*J. Phys.*, vol. 17, Jun. 1984, pp. 440–441.
Multiple retroreflector optical delay line (M. M. Broer, AT&T Bell Labs.) *Applied Optics* vol. 24, No. 16, Aug. 15, 1985—pp. 2489–2490.

*Primary Examiner*—Frank Gonzalez
*Attorney, Agent, or Firm*—Cumpston & Shaw

[57] ABSTRACT

An optical delay line includes first and second hollow front surface retroreflectors. A translator is coupled to one of the first and second retroreflectors for adjusting the distance between the retroreflectors while maintaining the optical relationship between them. An entrance is provided for introducing a light beam into the delay line so that the light beam is reflected between the first and second retroreflectors a plurality of times; and an exit is provided to couple the beam out of the delay line.

21 Claims, 5 Drawing Sheets

OPTICAL DELAY LINE

This invention relates generally to optical delay lines, and more particularly to a continuously variable retroreflector delay line for use with very short pulses.

Pump-probe experiments provide a valuable analytical technique for observing transients in chemical, physical, or electronic processes. In basic terms, an event to be studied is initiated by a "pump" pulse, and subsequently sampled with a "probe" pulse delayed in time from the pump pulse. By varying the time delay between the pump and probe pulses, the progress of the process over time can be observed.

The two pulse correlation technique is one known way of making such measurements. A train of ultra short laser beam pulses is split into two arms, a known delay is introduced into one arm, and the two arms are recombined either before or within the experimental system. The time delay is varied between predetermined limits to produce a convolution of the response to the pulse autocorrelation. Conventionally, the time delay is changed slowly by use of a motorized translation stage or the like, and data are accumulated over a relatively long period, e.g., 10-20 minutes. The effectiveness of this technique is limited by the low rate at which the time delay may be changed. This increases the noise, and prevents real time observation of the data.

The above types of phenomena can be observed in real time, if the rate of change of the time delay for the pulses can be increased. There is a need for a high speed repetitively scanning delay line that will create variable time delays as long or longer than the effect under study, in a way that minimizes noise and allows the delay to be varied rapidly, compared with prior art delay lines.

A delay line that allows the time delay to be changed at a more rapid rate than has heretobefore been possible allows measurements to be made with significant improvements in signal to noise ratio, by rapidly and repetitively scanning the time delay and averaging the collected data, with or without the need for phase sensitive detection. Thus, in the same time that was heretofore needed to make one slow scan, many thousands of fast scans can be made, and the data averaged. In addition, one substantial source of noise, the slow fluctuations in laser intensity over time, which was a serious problem when long scans were used, may be averaged to zero or filtered out, thus producing high signal to noise ratios.

Two desirable but heretofore mutually conflicting scanning characteristics are provided by the present invention, namely high scan rates, and relatively large changes in delay time. Previously, known apparatus and methods for moving optical elements in a delay line, such as voice coil translation, shakers, rotating mirror pairs, and rotating roof prisms could provide a relatively rapid scan rate, but only over a short distance. Known techniques for producing large distance changes include motors and crank shafts, cams, reciprocating lead screws used to drive a linear slide, and slides, all of which will provide the large distances needed, but only at slow rates.

Furthermore, special Consideration must be given to the optical elements used to delay short pulses of sub-100 femtosecond duration. Known scanners that use roof prisms, solid retroreflectors, glass lenses and filters, or any refractive material in the beam path introduce undesirable distortions when used in pulse systems with short pulse durations.

Briefly stated and in accordance with a presently preferred embodiment of this invention, an optical delay line for ultra short pulses includes a first hollow, front surface retroreflector;

second hollow front surface retroreflector having a second optical axis arranged parallel to but offset from the optical axis of the first retroreflector;

translating means coupled to at least one of the first and second retroreflectors for adjusting the distance between them;

entrance means for introducing a light beam into the delay line so that the light beam is reflected between the first and second retroreflectors a plurality of times; and exit means for directing the beam out of the delay line.

In accordance with another aspect of this invention, one of the elements of the delay line is mounted on a high speed long distance translator for moving the element on a linear path, and including a fixed stage; a galvanometer mounted on the fixed stage and having a rotatable output shaft having its axis of rotation aligned perpendicular to the desired direction of linear motion of a slide;

a translatable slide mounted on the fixed stage for linear motion in a desired direction;

mounting means on the slide for receiving the movable element of the delay line;

cam means mounted on the output shaft of the galvanometer means; and a taut band connected between the fixed stage and the slide means and driven by the cam means for moving the slide in response to rotation of the galvanometer shaft.

While the novel aspects of the invention are set forth with particularity in the appended claims, the invention itself together with further objects and advantages thereof may be more readily comprehended by reference to the following detailed description of a presently preferred embodiment of the invention taken in connection with the accompanying drawings, in which:

Figure 1:
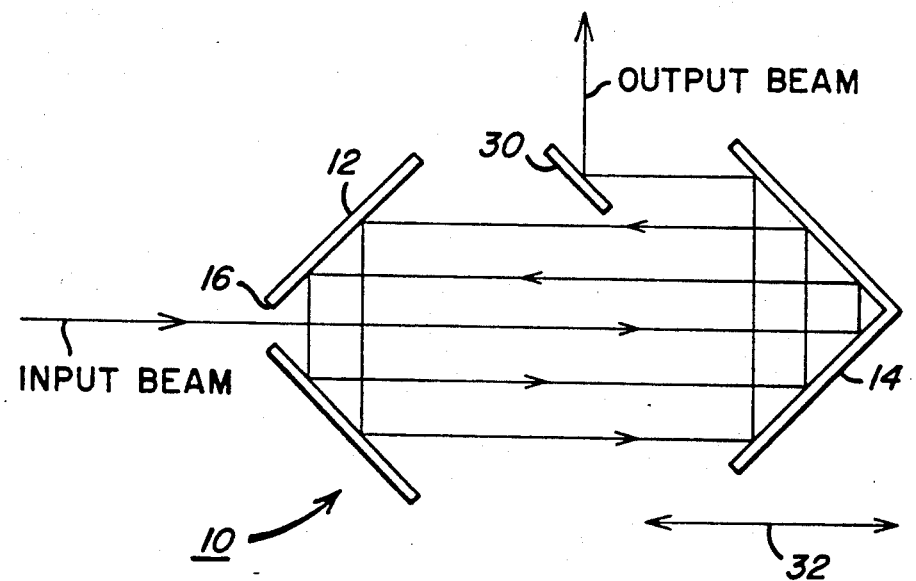
FIG. 1 is a diagrammatic view of an optical delay line in accordance with a preferred aspect of this invention.
Figure 2:
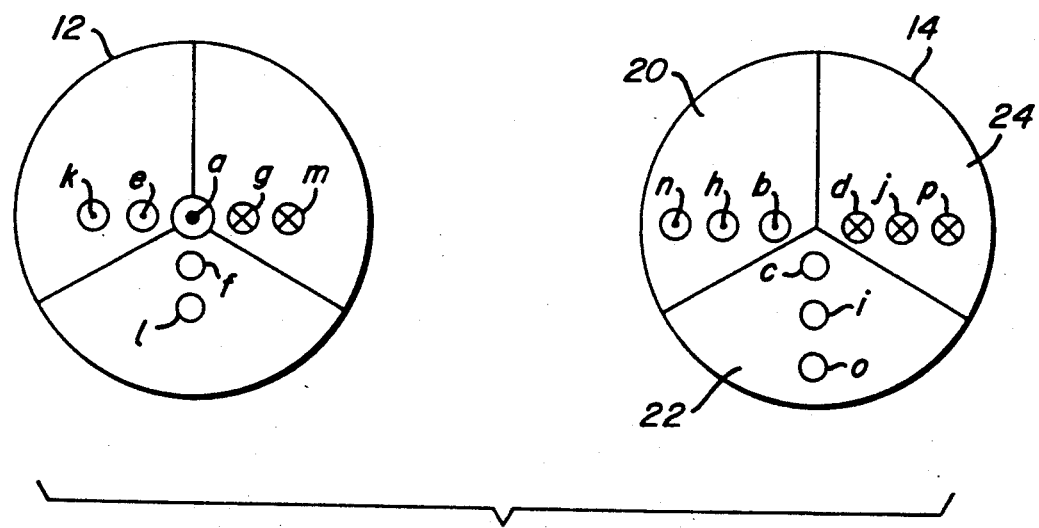
FIG. 2 is a front elevation of the retroreflectors of FIG. 1.

A delay line in accordance with a presently preferred embodiment of this invention is illustrated in diagrammatic form in FIGS. 1 and 2.

Referring first to FIG. 1, the delay line, indicated generally at 10, includes a first preferably hollow, front-surface retroreflector 12, and a second preferably hollow, cylindrically cut for low mass, front surface retroreflector 14, each shown in a diagrammatic section type view. The first retroreflector 10 is provided with an entrance aperture 16 at the apex thereof for admitting an input light beam into the delay line. The input beam is introduced generally along the central optical axis of symmetry of retroreflector 12. Retroreflector 14 is arranged with its central optical axis of symmetry arranged parallel to but offset from the axis of symmetry of retroreflector 12, so that the input beam initially impinges on and is reflected by one of the mirror surfaces of retroreflector 14.

FIG. 2 shows each of the two retroreflectors 12 and 14 in a head on view, as it would appear to an observer standing between the retroreflectors and facing one or the other. The entrance, exit and intermediate reflection points of the light beam on the mirrored surfaces of the retroreflectors are shown by the small circles with dots, small circles with x's, and hollow circles respectively. Thus the input beam first strikes the first surface 20 of retroreflector 14, is reflected from surface 22 to surface 24, and is redirected therefrom back towards retroreflector 12 along a line parallel to the entrance line. For convenience, the progression of the light beam from the input aperture to the output of the delay line is indicated sequentially by the letters a through p. A small front surface exit mirror 30 is disposed between the retroreflectors for directing the output beam to a point of utilization.

As mentioned above, hollow front surface retroreflectors are preferred in this invention. The presence of any optical material between the reflective surfaces of retroreflector 12 and retroreflector 14 could distort the ultra short pulses for which the present invention is particularly suited, by introducing group velocity dispersion that would tend to stretch a pulse in the low femtosecond range. Accordingly, solid retroreflectors, corner cubes and prisms should preferably not be used in accordance with the invention unless these effects can be tolerated or compensated. Additionally, hollow retroreflectors may be manufactured with substantially lower mass than any of the above solid retroreflectors, and accordingly can be moved more rapidly by lower forces than solid retroreflectors of equivalent size.

Preferably, the change in path length and accordingly the change in delay time is created by moving one of the retroreflectors, relative to the other. For example, in accordance with a preferred aspect of the invention, retroreflector 14 is moved along its optical axis as shown by double headed arrow 32 in FIG. 1. The change in delay time is a function both of the distance through which retroreflector 14 is moved, and the number of reflections of the light beam that occur between the retroreflectors. For example, if retroreflector 14 is moved 1 cm. and six reflections occur as shown in FIG. 1, the change in total optical path length is 6 cm. This is equivalent to a change in time delay of about 200 picoseconds. The change in time delay may be increased by either increasing the range of motion of the one retroreflector with respect to the other, or by increasing the number of reflections. However, the number of reflections may not be increased without limit, since the light beams used in experiments of the type to which the present invention is directed have finite dimensions. Generating an excessive number of reflections would introduce losses that are better avoided.

Figure 3:
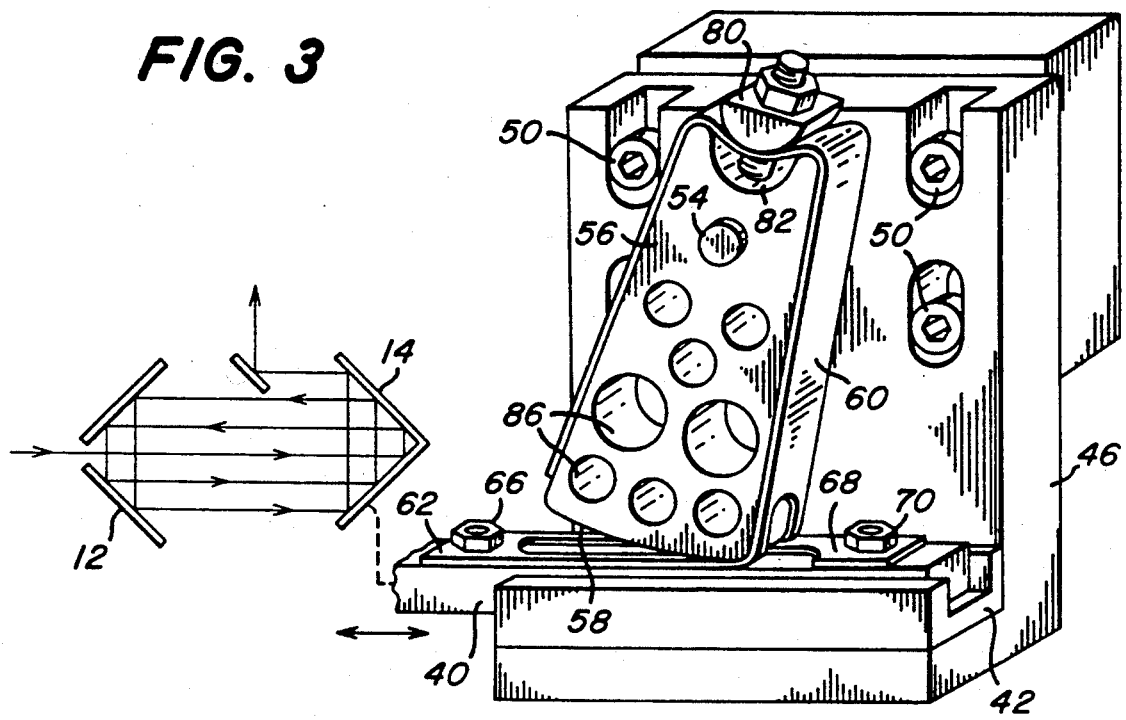
FIG. 3 is a side elevation of a high speed long distance translator for the delay line of this invention.

As mentioned above, in many cases it is desirable to repetitively change the optical delay from a lower to an upper limit, at the rate of several hertz to make the real time observation of the ongoing process possible, while at the same time minimizing the effect of noise by averaging data collected during repetitive scans. The rapid repetitive motion of one or both of the retroreflectors must be provided in a manner that does not change the properties, position or pointing direction of the beam. These considerations place constraints on the design of the system that are addressed by the present high speed long distance translator for a movable element of an optical delay line. The use of face to face retroreflectors and multiple reflections significantly reduces the demands on the translator, particularly with respect to motion induced distortions of the retroreflectors. A preferred embodiment of a high speed long distance translator in accordance with this invention is shown in FIG. 3. The fixed retroreflector 12 is supported by conventional means, not shown. Movable retroreflector 14 is mounted on one end of a miniature ball or crossed roller-bearing slide rail 40 that is mounted for reciprocating movement in slide support 42. An air bearing slide may also be employed. The retroreflector 14 may be mounted to the free end of the slide rail, by any convenient means. The retroreflector 14 should be rigidly attached to the end of the rail. Preferably, the retroreflector is glued or otherwise securely fastened to a holder, which is screwed to the end of the slide rail. Slide 42 is rigidly secured to a generally L-shaped rigid bracket 46. A galvanometer, such as a General Scanning G325DT galvanometer is rigidly attached to bracket 46, for example by bolts 50. A rotatable galvanometer output shaft 54 extends through bracket 46 and overhangs slide 42.

An elongated low mass cam 56 is attached to shaft 54. Cam 56 has an outer face 58 in the form of a circular arc having a radius equal to the distance between the output shaft and the upper surface of slide rail 40. A taut band 60 is connected to slide 42. Taut band 60 is shown in perspective in FIG. 4, and includes a first and second end portions 62, 68 attached to spaced apart points on slide rail 40, for example, by bolts 66, 70. A central slot 72 allows end 68 to pass through the center of the taut band. Taut band extends around the outer periphery of cam 56, and tension is maintained by adjustable tensioner piece 80 that is preferably received in a threaded opening 82 in the body of cam 56. Preferably, the taut band is formed from 0.004" stainless steel shimstock. As used herein, and in the claims, taut bands also includes a taut wire or cable, or the like.

As cam 56 rotates, the cam reels the slide in from both directions, minimizing slip and backlash. The slide displacement is linearly related to the angle through which the output shaft moves in proportion to the cam radius.

Preferably, the mass of cam 56 is minimized by providing through holes 86.

In accordance with an exemplary embodiment of the invention, cam 56 has a throw of 1.5" and accordingly the circular arc 58 has a radius of 1.5". The galvanometer shaft moves through an angle of plus or minus 17.5° at frequencies below 30 Hz. This angular displacement translates to a slide displacement of 23 mm peak to peak. A 4× folded delay line having one retroreflector mounted on the slide rail provides 307 picosecond change in delay time, when used with this translation device.

Preferably, the galvanometer drive unit is connected in a closed loop circuit also that includes a conventional sensor (not shown) on the galvanometer shaft for providing an analog position output. A General Scanning CX6325 galvanometer drive unit has been successfully employed in accordance with the invention. In an exemplary embodiment of the invention in which the retroreflector load has an estimated moment of inertia of approximately 150 gram-centimeter$^2$ the combination has a mechanical resonance of 30 Hz above which a 2-pole rolloff to 180 Hz where the servo electronics pole is located, is observed. Preferably, the response is nearly critically damped, so the scanner may be driven through resonance with very small amplitude overshoot.

The galvanometer drive unit receives an analog input to program the motion, and provides an analog position output that is highly accurate and linearly related to the shaft angle. It is important that the shaft remain tightly coupled to the slide, and when this is done, the position voltage is linearly related to the optical delay, and data corresponding to the delay is available instantaneously. In an especially preferred embodiment of the invention, the analog drive signal generates the time axis on an oscilloscope, the vertical deflection of which is coupled to the output of the probe pulse, and the data can be observed in real time.

Figure 5:
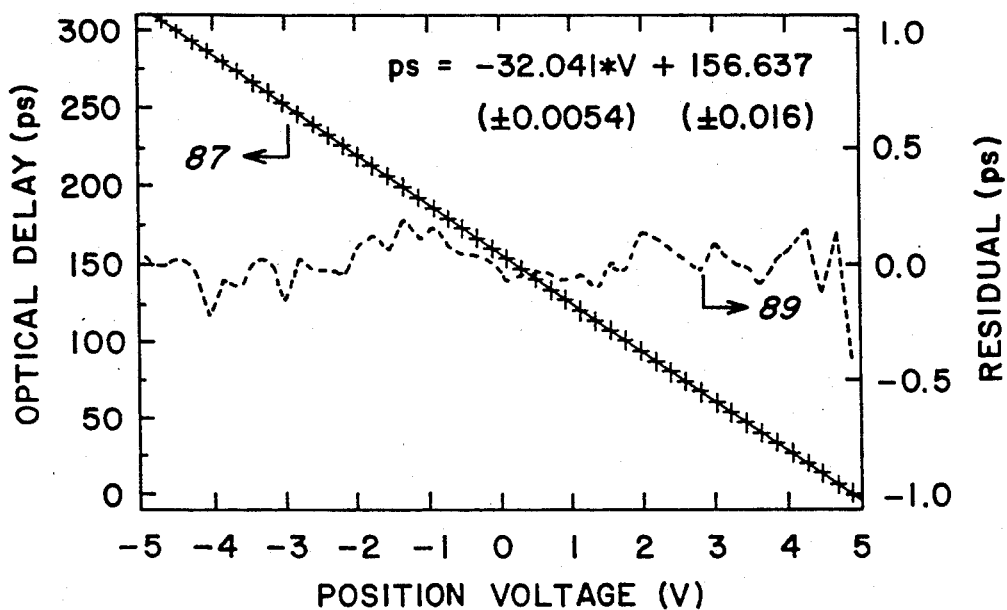
FIG. 5 is a graph showing the performance of the translator of FIG. 4.

FIG. 5 shows the linearity 87 and calibration accuracy 89 of the optical delay versus position voltage of the translator of FIG. 3. The translator was operated over a full 23 mm path at a rate of 20 Hz. The calibration is linear to within 0.02% across the complete range, including the ends of the scan. The error is plotted in picoseconds across the same range of position voltages on the same graph in FIG. 5.

Figure 4:
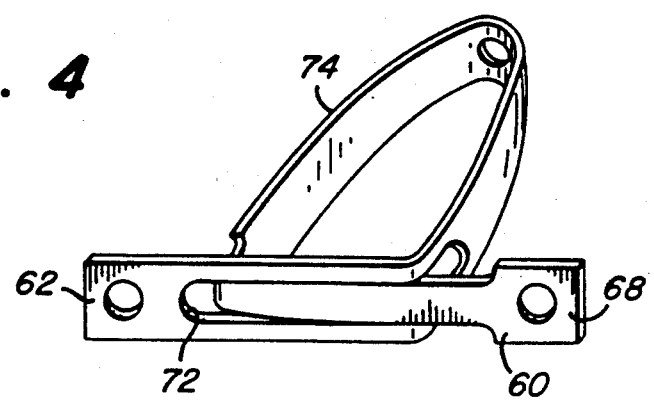
FIG. 4 is a perspective view of the taut band of FIG. 3.
Figure 6:
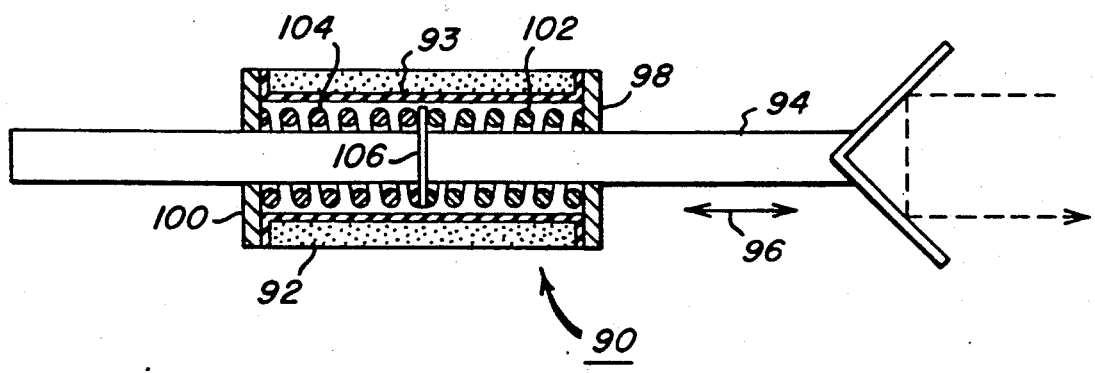
FIG. 6 is a diagrammatic view, partly in section of an alternative form of translator in accordance with this invention.

While the galvanometer translator shown in FIG. 4 represents the presently preferred structure for controlling the position and movement of the moving retroreflector, other forms of translator may also be used. For example, a solenoid translator is illustrated at FIG. 6. The translator indicated generally at 90 includes an electrical solenoid winding 92, which is preferably a multi-turn winding formed on an elongated conventional bobbin 93 or the like, and including at least first and second conductors (not shown) for connecting the solenoid to an electrical control source. A linearly movable core 94 is disposed for movement along a principal axis of solenoid 92 for reciprocal motion, as indicated by double headed arrow 96. Preferably, linear end bearings 98 and 100 of conventional design support core 94 with respect to bobbin 93, and limit the motion of the core to linear motion on the main axis of the solenoid. It is desirable that bearings 98 and 100 limit the motion of the core as accurately as possible, to straight line motion along the axis.

Preferably, core 94 is biased towards a quiescent centered position by a spring or pair of springs 102 and 104, which may preferably, as shown, be wound in opposite directions. A movable center baffle 106 is attached to core 94 and engages one end each of springs 102 and 104. The other end of each spring is engaged by the bearings 98 and 100 respectively.

In accordance with another aspect of the invention, springs 102 and 104 may be wholly or partly replaced by providing a dual opposed solenoid. Single winding solenoid 92 is replaced by a dual oppositely wound solenoid structure, each solenoid coil tending to move core 94 in the opposite direction. Movement of the core is controlled by varying the signals supplied to the two solenoid windings.

In either embodiment, core 96 is preferably constrained against all motion, except linear motion, along the axis. Particularly, it is preferred that core 94 be constrained against rotational motion, for example, by providing the core in the form of an elongated triangular or rectangular rod, the rotation of which may conveniently be controlled by providing appropriately shaped bearings 98 and 100 respectively.

Figure 8:
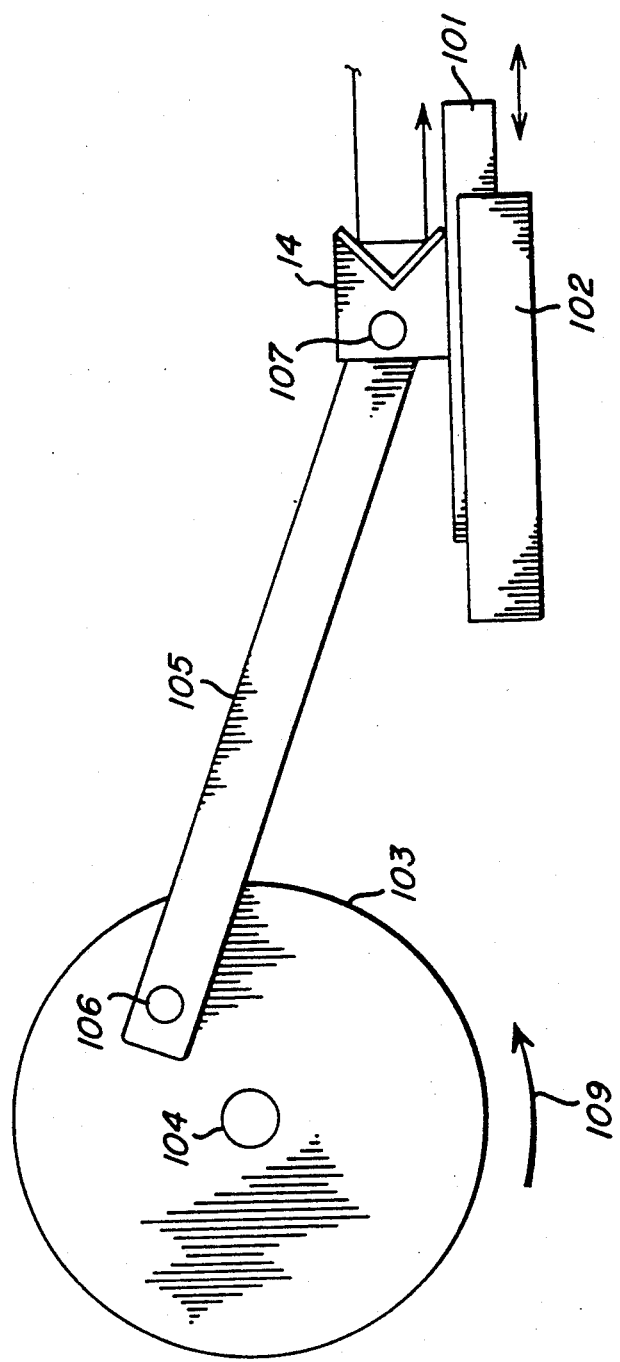
FIG. 8 is a diagrammatic view of another form of translator according to this invention.

In accordance with another embodiment of this invention, as shown in FIG. 8, movable retroreflector 14 is mounted on a linear slide 101 constrained for movement in a straight line on a stage 102. Drive wheel 103 is driven about a shaft 104, by a motor or the like, not shown. Drive wheel 103 is connected to movable retroreflector 14 by linkage 105 joining eccentric pivot 106 on drive wheel 103, with pivot 107 on movable retroreflector 14. As wheel 103 rotates in the direction shown by arrow 109, movable retroreflector 14 moves back and forth in a generally sinosoidal fashion with respect to stage 102. The rotational motion of wheel 103 is thereby translated into a linear motion.

Figure 7:
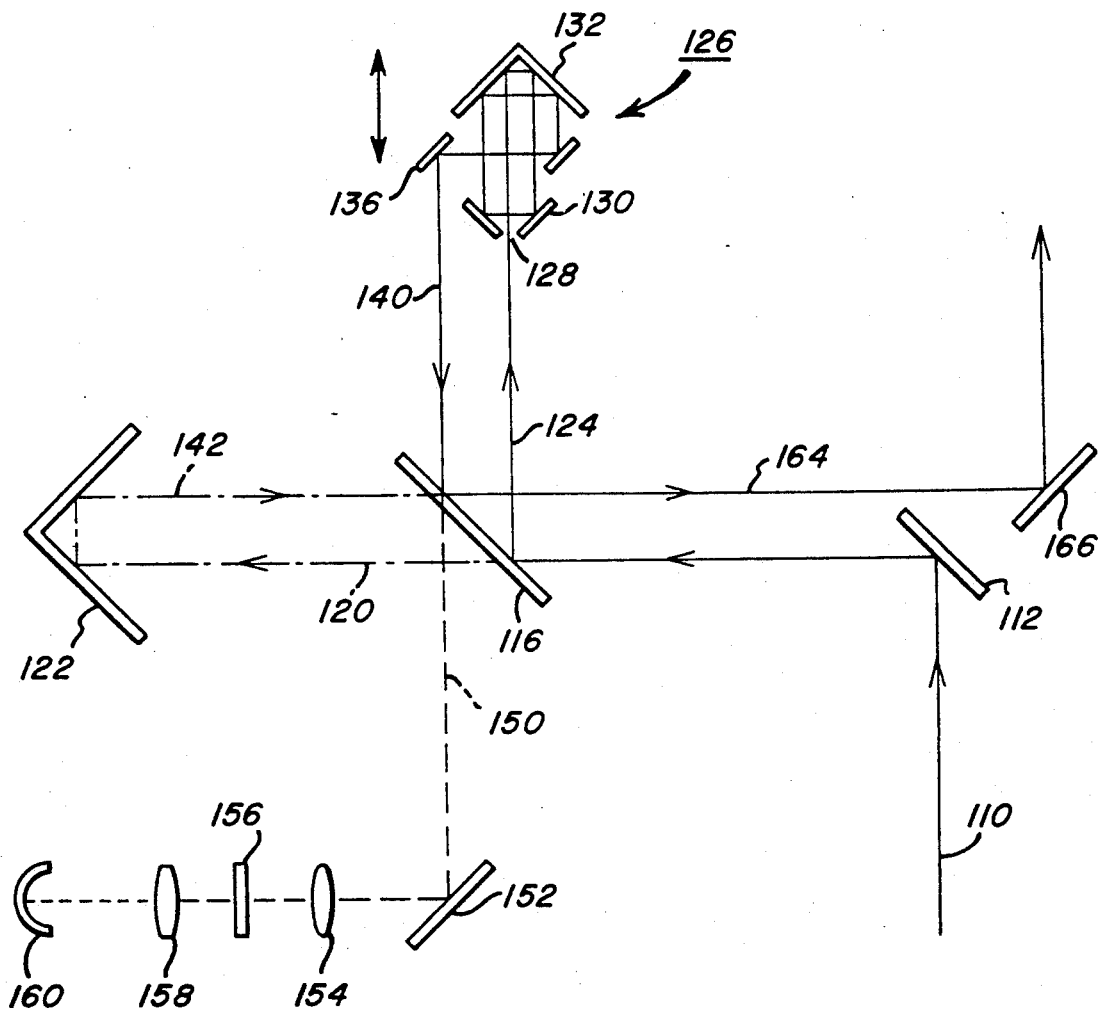
FIG. 7 is a schematic diagram of an auto correlator/-pump-probe scanner in accordance with this invention.

The optical delay line of this invention defines a particular application in an autocorrelator/pump/probe scanner, as shown in FIG. 7. The autocorrelator/scanner is shown in diagrammatic form. A source of pulses from a short pulse width laser or the like enters along the ray 110, and is reflected by a mirror 112 through a 90 degree angle to a beam splitter 116. A first part of the split beam 120 propogates towards a stationary hollow retroreflector 122. The second part of the split beam 124 enters a delay line in accordance with this invention through an aperture 128 in a fixed retroreflector 130, and is reflected a plurality of times between the fixed retroreflector and a moving retroreflector 132. The exit beam is directed by mirror 136 back towards beam splitter 116. The exit ray 140 from the delay line is combined with ray 142 from the fixed hollow retroreflector 122, to form a first exit beam 150 that is directed to a detector by a mirror 152, a lens 154, a doubling crystal 156, a filter 158 for blocking the fundamental and passing the second harmonic, and a detector 160. The other combined beam 164 is directed by mirror 166 to the pump-probe experiment. The autocorrelator shown in FIG. 7 has a number of advantages over other autocorrelator designs. A spinning mirror pair or roof prism correlators cannot use retroreflectors, and therefore are sensitive to misalignment out of the plane of motion of the moving reflector. Spinning mirror pair retroreflectors have a reduced duty cycle, because the laser beam is directed away from the optics during a large part of the rotation of the spinning mirror. In rotating glass block autocorrelators, the amount of dispersion in the beam varies with time, and therefore cannot be fully compensated. Still another disadvantage of prior art rotating optics autocorrelators is that because the beam scans across the surface of the various optical elements of the autocorrelator, any imperfection or speck of dirt will be averaged into the data. The autocorrelator shown in FIG. 7 takes advantage of the ability of the optical delay line to provide fast scans over long delay times.

By averaging successive scans, greatly improved signal to noise ratio can be achieved. In the time it takes to make one slow scan with prior art delay lines, many thousands of fast scans can be made and averaged together. The slow fluctuations in source intensity that limit the accuracy of slow scans are averaged to zero over a large number of scans. Laser noise is as much as 40 dB lower at 10 hertz than it is at 0.1 hertz. A lock-in amplifier would pass a 1 hertz noise in a slow scan, but will reject such noise in a fast scan mode using the delay line of this invention. Thus, improvements in signal to noise ratio of at least 40 dB can be obtained, using the delay line of this invention.

While the invention has been described in connection with a presently preferred embodiment thereof, those skilled in the art will recognize that many modifications and changes may be made therein, without departing from the true spirit and scope of the invention, which accordingly is intended to be defined solely by the appended claims.

What is claimed is:

1. An optical delay line for ultra short pulses comprising:
   a first hollow front surface retroreflector;
   a second hollow front surface retroreflector; means for positioning the second retroreflector with respect to the first hollow front surface retroreflector so as to cause a light beam to be reflected between the first and second retroreflectors a plurality of times parallel to an optical axis;
   translating means coupled to at least one of the first and second retroreflectors for adjusting the distance between the retroreflectors along a line of movement parallel to the reflected light beam as it enters and exits the retroreflectors;
   entrance means for introducing a light beam into the delay line so that the light beam is reflected between the first and second retroreflectors a plurality of times; and
   exit means for directing the light beam out of the delay line.

2. The optical delay line of claim 1 in which the first and second retroreflectors are offset and in which the entrance means comprises a first reflective mirror of said at least one of the hollow front surface retroreflectors.

3. The optical delay line of claim 1 in which the first and second retroreflectors are offset and in which the exit means comprises a first reflective mirror of said at least one of the hollow front surface retroreflectors.

4. The optical delay line of claim 1 in which the entrance means comprises an aperture formed through one of the first or second hollow front surface retroreflectors for admitting an input beam.

5. The optical delay line of claim 4 in which the input beam enters parallel to the line of movement of the translating means.

6. The optical delay line of claim 1 in which said plurality of times is at least 4.

7. The optical delay line of claim 1 in which the exit means comprises a mirror disposed between the first and second retroreflectors.

8. The optical delay line of claim 1 in which the translating means comprises:
   a slide moveable in a direction parallel to the direction of the input beam; and
   means mounting said at least one of the first or second retroreflectors to the slide.

9. The optical delay line of claim 8 in which the translating means further comprises:
   fixed stage means on which the slide is mounted;
   galvanometer means mounted on the fixed stage means and having a rotatable output shaft having its axis of rotation aligned perpendicular to the axis of the moving retroreflector;
   cam means mounted on the output shaft; and
   taut band means connected to the slide and driven by the cam means for moving the slide in response to rotation of the galvanometer shaft.

10. The optical delay line of claim 1 in which either one or both retroreflectors is replaced with front surface mirrors.

11. The optical delay line of claim 1 in which the translating means comprises:
    electrical solenoid means;
    moveable core means mounted for linear movement with respect to the electrical solenoid means; and
    mounting means for attaching said at least one of the first and second retroreflectors to the core means.

12. The optical delay line of claim 11 further comprising means responsive to one of the electrical solenoid means and the moveable core means for providing an electrical position signal related to the position of the at least one retroreflector that is attached to the core means.

13. The optical delay line of claim 11 comprising bias means operatively associated with the solenoid means and the moveable coil means for biasing the core means against said linear movement.

14. The optical delay line of claim 13 in which the bias means comprises coil spring means having an axis aligned with an axis of the electrical solenoid means.

15. The optical delay line of claim 13, in which the bias means comprises bias solenoid means to create an oppositely directed force on the core means.

16. The optical delay line of claim 1 in which the translating means comprises:
    a rotatable drive wheel;
    a drive rod having one end pivotally attached to the drive wheel and the other end pivotally coupled to said at least one of the first and second retroreflectors; and
    means constraining said at least one of the first and second retroreflectors for movement along a line.

17. The optical delay line of claim 16 in which the containing means comprises a translatable linear stage.

18. A high speed repetitively moving long distance actuator for a movable element of an optical delay line comprising:
    fixed stage means;
    translatable slide means mounted to the first stage means for linear motion in a desired direction;
    mounting means on the slide means for receiving the movable element of the delay line;
    galvanometer means mounted on the fixed stage means having a rotatable aligned perpendicular to the desired direction of linear motion of the slide means;
    cam means mounted on the output shaft; and
    taut band means connected between the fixed stage means and the slide means and driven by the cam means for moving the slide means in response to rotation of the galvanometer shaft.

19. The high speed actuator of claim 18 in which the cam means comprises a peripheral surface comprising an arc of a circle having a radius equal to the distance between the output shaft and the slide means.

20. The high speed long distance actuator of claim 19 further comprising tensioning means attached to the cam means for tensioning the taut band means.

21. The actuator of claim 20 in which the mounting means comprises means for mounting a retroreflector at one end of the slide means.

* * * * *